UNITED STATES PATENT OFFICE.

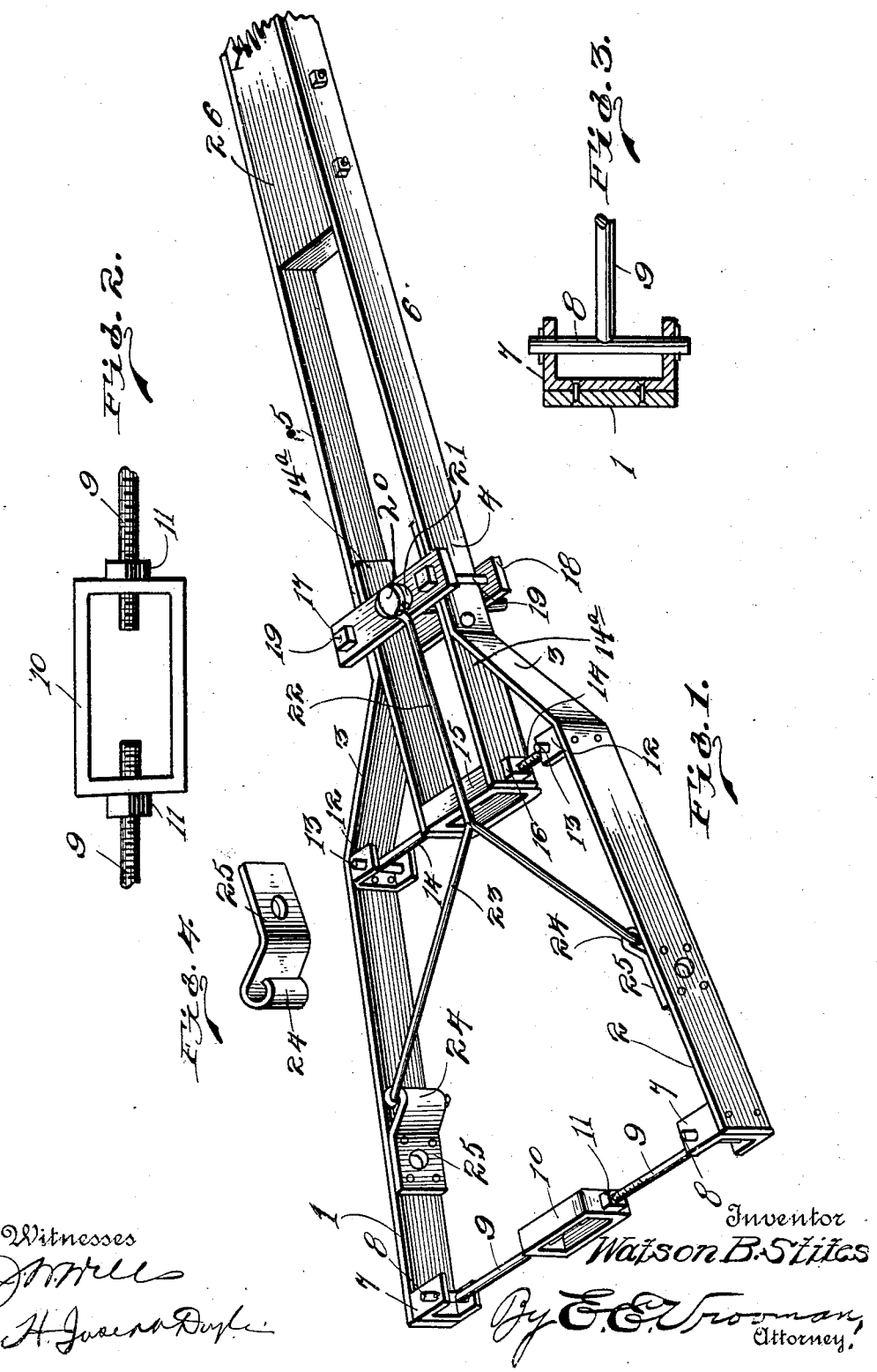

WATSON B. STITES, OF HIAWATHA, KANSAS.

WAGON-TONGUE.

977,568.  Specification of Letters Patent.  Patented Dec. 6, 1910.

Application filed March 8, 1910. Serial No. 548,034.

*To all whom it may concern:*

Be it known that I, WATSON B. STITES, a citizen of the United States, residing at Hiawatha, in the county of Brown and State of Kansas, have invented certain new and useful Improvements in Wagon-Tongues, of which the following is a specification, reference being had therein to the accompanying drawing.

This invention relates to draft gear for vehicles, and the principal object of the same is to provide novel tongue hounds that may be adjusted to fit different vehicles and which provide a novel tongue socket, said tongue socket being equipped with means for attaching a doubletree thereto, and bracing means being provided which connect the doubletree attaching means to the tongue hounds.

Figure 1 is a perspective view of the improved tongue hounds and tongue socket. Fig. 2 is a detail view of one of the adjusting devices for the hounds. Fig. 3 is a detail sectional view showing the manner of connecting the adjusting devices with the hounds. Fig. 4 is a detail perspective view of one of the hound clips with which the brace for the doubletree support connects.

Referring to said drawings by numerals, 1—2 designates the side members of the tongue hounds whose forward ends 3 converge and terminate in the elongated spaced-apart, parallel, longitudinally-arranged members 4—5 that form a tongue socket 6. The tongue hounds and the tongue socket are preferably formed of strap metal. Side members 1—2 of the hounds have the inner surfaces of their rear ends equipped with inwardly projecting housings 7. Said housings are rigidly fastened to their side members and each has a bolt 8 mounted therein from which the threaded rod 9 projects, said rods having their threaded portion extending into a substantially rectangular turnbuckle 10. Each rod 9 is equipped with a lock nut 11. It will be obvious that by loosening nuts 11, turnbuckle 10 may be rotated to spread or draw together the rear ends of side members 1—2, to adapt them for connection with the running gear of a vehicle.

On the inner face of side members 1—2 adjacent their junction with the converging forward portion, each member is equipped with another housing 12, each housing having a bolt 13 mounted therein from which a threaded rod 14 projects. Said rods pass through the free ends of the spaced parallel plates 14ª which project rearwardly from the tongue socket and adjustably engage the ends of a turnbuckle 15 that is located between the free ends of said plates 14ª of the tongue socket. A lock nut 16 is provided for each rod 14.

The forward turnbuckle connection between the members of the hounds may be manipulated to adjust the forward portion of said hounds to compensate for the adjustments of the rear turnbuckle.

The bolt housings of the side members of the hounds may be of strap metal bent to form the parallel flanges with which the end bolt engages. And it will be seen that they provide a simple but strong connection for the adjusting rods, for the reason that their flanges are arranged so that the end bolts cannot become jarred therefrom.

Upper and lower straps 17—18 project transversely across the tongue members at their junctions with the plates 14ª, said straps having their projecting ends connected by the bolts 19 which clamp said straps across the tongue socket. A doubletree bolt 20 extends through the center of said straps, the upper end of said bolt being engaged by the hook shaped end 21 of a brace rod 22 whose rear portion is bifurcated, as indicated at 23. The ends of the bifurcated portions of brace rod 22 has a hooked engagement with the rolled free end 24 of the attaching clips 25 that are fastened to the inner faces of the side members 1—2. Straps 17—18 may be adjusted longitudinally of the tongue socket by releasing their clamping bolts, to permit the necessary adjustment of brace rod 22 to compensate for the adjustment of the side members 1—2. The usual tongue 26 is bolted or otherwise fastened within the tongue socket.

What I claim as my invention is:—

A device of the character described comprising adjustable tongue hounds, a tongue socket projecting from the forward portion thereof, upper and lower clamping straps extending across said socket, means for connecting said straps for adjustably holding the same in engagement with said socket, a doubletree bolt extending through said straps, and bracing means connecting said doubletree with said hounds.

In testimony whereof I hereunto affix my signature in presence of two witnesses.

WATSON B. STITES.

Witnesses:
　JAMES W. STRAHAN,
　JOHN C. STRAHAN.